(12) United States Patent
Tourne

(10) Patent No.: US 7,364,366 B2
(45) Date of Patent: Apr. 29, 2008

(54) CIRCUIT BOARD ASSEMBLY HAVING A GUIDE INSERT

(75) Inventor: Joseph A. A. M. Tourne, Helmond (NL)

(73) Assignee: Viasystems Group, Inc., St. Louis, MO (US)

( * ) Notice: Subject to any disclaimer, the term of this patent is extended or adjusted under 35 U.S.C. 154(b) by 0 days.

(21) Appl. No.: 11/345,858

(22) Filed: Feb. 1, 2006

(65) Prior Publication Data

US 2006/0215965 A1    Sep. 28, 2006

Related U.S. Application Data

(60) Provisional application No. 60/649,455, filed on Feb. 2, 2005.

(51) Int. Cl.
   *G02B 6/38*    (2006.01)
   *G02B 6/36*    (2006.01)
(52) U.S. Cl. .................... 385/69; 385/55; 385/56; 385/58; 385/60; 385/88; 385/89; 385/90; 385/92
(58) Field of Classification Search .................... 385/69
   See application file for complete search history.

(56) References Cited

U.S. PATENT DOCUMENTS

| | | | |
|---|---|---|---|
| 4,863,232 A * | 9/1989 | Kwa ........................... 385/89 |
| 5,155,785 A * | 10/1992 | Holland et al. ............... 385/89 |
| 5,260,854 A | 11/1993 | Hileman et al. |
| 6,229,942 B1 * | 5/2001 | Engberg et al. ............... 385/39 |
| 6,259,840 B1 * | 7/2001 | Munoz-Bustamante et al. ........................... 385/39 |
| 6,331,079 B1 | 12/2001 | Grois et al. |
| 6,361,218 B1 | 3/2002 | Matasek et al. |
| 6,371,657 B1 | 4/2002 | Chen et al. |
| 6,594,435 B2 * | 7/2003 | Tourne ....................... 385/136 |
| 6,623,177 B1 * | 9/2003 | Chilton ....................... 385/88 |
| 6,801,693 B1 * | 10/2004 | Jacobowitz et al. .......... 385/50 |
| 6,811,322 B2 | 11/2004 | Chen et al. |
| 6,848,840 B2 * | 2/2005 | Tourne ....................... 385/88 |
| 6,976,303 B2 | 12/2005 | Chen et al. |
| 7,039,274 B2 * | 5/2006 | Okada et al. ................. 385/31 |
| 6,981,803 B2 | 6/2006 | Grzegorzewski et al. |

* cited by examiner

*Primary Examiner*—Frank G. Font
*Assistant Examiner*—Ryan Lepisto
(74) *Attorney, Agent, or Firm*—Gallop, Johnson & Neuman, L.C.

(57) ABSTRACT

A guide insert having a guide member having an arcuate portion for bending an optical fiber of a backplane, and a circuit board assembly comprising the backplane and a daughterboard wherein the daughterboard is operatively connected to the backplane via the guide insert.

2 Claims, 2 Drawing Sheets

CIRCUIT BOARD ASSEMBLY HAVING A GUIDE INSERT

CROSS-REFERENCE TO RELATED APPLICATIONS

This application claims the benefit under 35 U.S.C. 119(e) of U.S. Provisional Application Ser. No. 60/649,455, filed Feb. 2, 2005, the contents of which are hereby expressly incorporated by reference herein in its entirety.

STATEMENT REGARDING FEDERALLY SPONSORED RESEARCH AND DEVELOPMENT

Not applicable.

BACKGROUND OF THE INVENTION

Optical fiber as used in standard telecommunications and other applications is based upon the principle of snell's law and total internal reflection. Each fiber has a central core and an outer layer known as the cladding. By establishing a core with an index of refraction higher than the index of refraction of the cladding, the light will totally reflect internally rather than passing through the core and become lost.

The employment of a device known as a ferrule makes optical fiber connectors possible. This device supports and aligns the optical fiber or fibers, allowing for a precise coupling of fibers. In a single fiber connector, the ferrule is generally a cylindrical structure, and is often ceramic. The ferrule holds the fiber in a central portion thereof and is adhered therein with cured epoxy resin. Polishing the end of the fiber in the ferrule creates an optically smooth, planar surface with the optical fiber aligned as close as possible to the center of the ferrule. When two unstable ferrules are aligned end to end through a mechanical connector, optical coupling takes place allowing the optical transfer therethrough. However, the joining ferrule surfaces may not be orthogonal, thus producing unwanted reflection.

Backplanes (circuit boards known in the art as motherboards), which support a plurality of secondary circuit boards (known in the prior art as "daughterboards") are well known. The daughterboards are connected to the backplane through connectors which not only serve to mechanically grip the daughterboards, but also provide an electrical connection between each daughterboard and the backplane.

There is a need in the art for an improved optical backplane which permits daughterboards to be optically and electrically connected thereto. It is to such an improved optical backplane and components for constructing the backplane assembly that the present invention is directed.

DETAILED DESCRIPTION OF THE INVENTION

Figure 1:
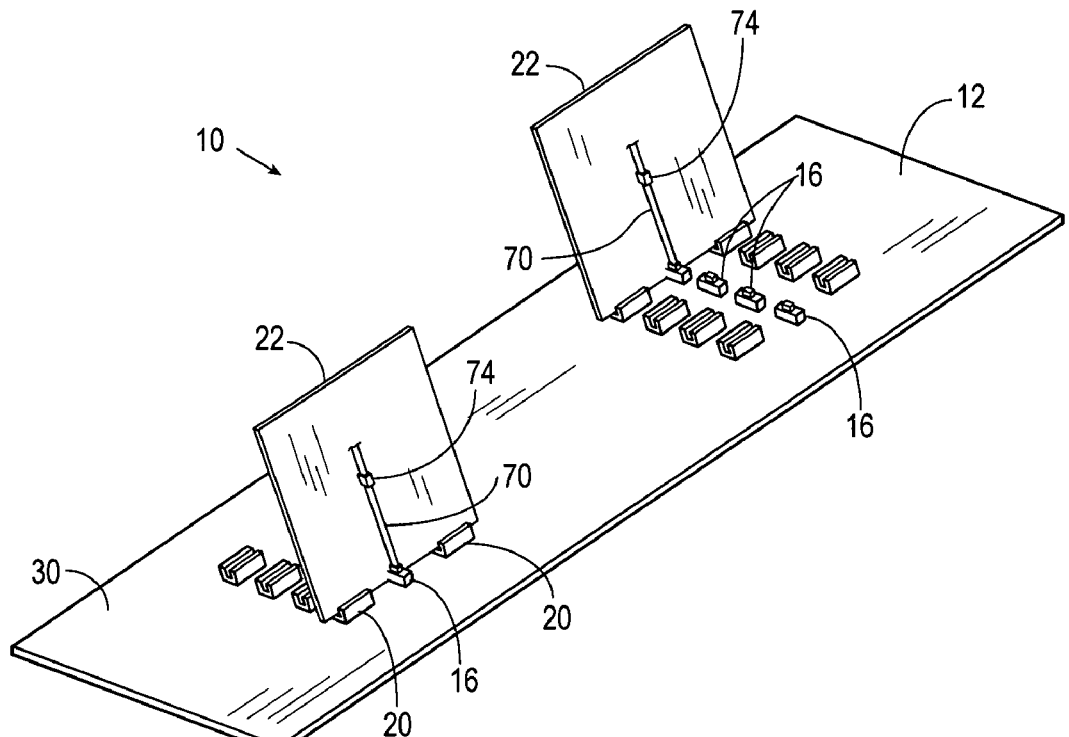
FIG. 1 is a perspective view of a circuit board assembly constructed in accordance with the present invention.

Referring now to the drawings, and in particular to FIG. 1, shown therein and designated by a reference numeral 10 is a circuit board assembly constructed in accordance with the present invention. The circuit board assembly 10, in general, comprises a backplane 12, one or more fiber optic cables 14 (FIG. 2) in the backplane 12, one or more guide inserts 16 inserted into the backplane 12, one or more connector assemblies 20 connected to the backplane 12, (only two of the connector assemblies 20 are numbered in FIG. 1 for purposes of clarity), and one or more daughterboards 22 attached to the backplane 12 via the connector assemblies 20. The backplane 12 can be any type of circuit board, such as an electric circuit board, an optical circuit board, or an electro-optical circuit board. In the example depicted in FIG. 1, the backplane 12 is designed to support eight daughterboards 22, but it will be understood by a person of ordinary skill in the art that the backplane 12 may support from one to seven daughterboards 22 or any number above eight which is suitable or appropriate for the particular backplane 12, used in the invention.

Figure 2:
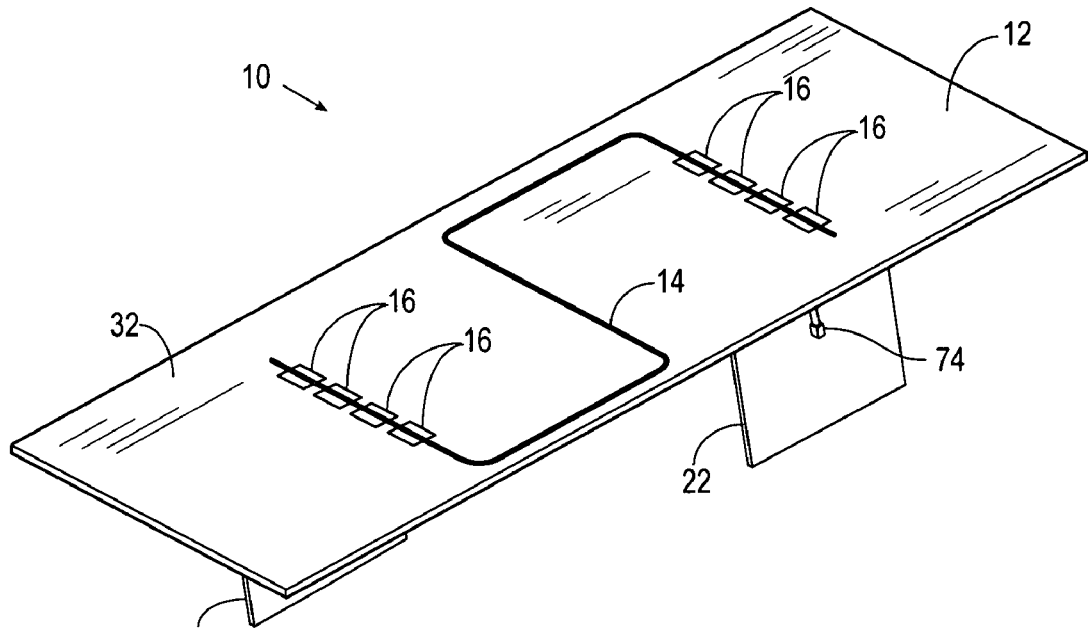
FIG. 2 is a perspective view of an undersurface of the circuit board assembly depicted in FIG. 1.
Figure 3:
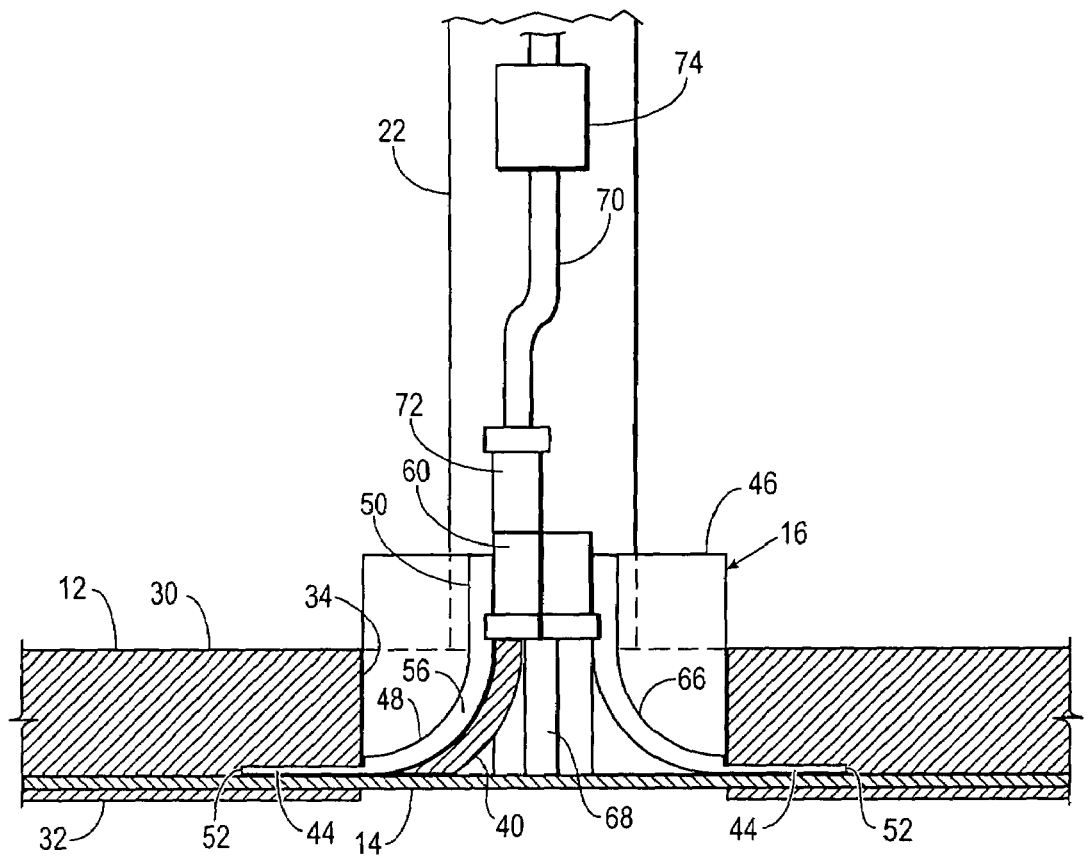
FIG. 3 is a cross-sectional view of the circuit board assembly depicting a guide insert constructed in accordance with the present invention.

The backplane 12 has a first side 30, a second side 32 (shown in FIG. 2), and one or more apertures 34 extending from the first side 30 through to the second side 32 of the backplane 12 (see FIG. 3). As will be described in more detail below, each of the apertures 34 is sized and adapted for receiving one of the guide inserts 16. In the example shown in FIG. 1, the backplane 12 is provided with eight apertures 34 (not shown, each of which containing one of the guide inserts 16.

The fiber-optic cable 14 extends across a portion of the second side 32 of the backplane 12. As shown in FIG. 2, preferably the fiber optic cable 12 extends in a serpentine (curved) pattern so as to extend generally adjacent to or across each of the apertures 34 positioned within the circuitboard 12. The fiber optic cable 14 is a cable constructed of a light transmitting material, such as silica which preferably has a diameter in a range from about 10 micrometers to about 125 micrometers and is surrounded by a cladding. The fiber optic cable 14 described herein may be less than 10 μm in diameter or greater than 125 μm in diameter. Further, it is envisioned that as technology improves the diameter of the light transmitting material within the fiber optic cable 14 will be generally reduced. The fiber optic cable 14 can include more than one cable of light transmitting material or optical fiber. In one embodiment, the fiber optic cable 14 includes a plurality of separate optical fibers (not shown) with each optical fiber adapted to be in communication with at least one of the daughterboards 22 via the guide insert 16 as described herein.

Each connector assembly 20 is anchored to the backplane 12 in a method known in the art and is in communication with one or more second circuits (not shown but preferably an electrical circuit) residing on the backplane 12. Typically, the connector assemblies 20 provide electrical connections between the one or more second circuits on the backplane 12 and a circuit on the daughterboard 22. The connector assemblies 20 may provide electrical connections, optical connections, or electro-optical connections between the backplane 12 and the daughter boards 22. Connector assemblies, such as the connector assemblies 20 are well known in the art, thus, no further description concerning the construction or use of the connector assemblies 20 is deemed necessary to teach one skilled in the art how to make and use the connector assemblies 20 of the present invention.

Each of the daughterboards 22 is connected to one or more of the connector assemblies 20 such that the daughterboard circuit of the daughterboard 22 communicates with the one or more second circuits on the backplane 12. For example, as depicted in FIG. 1, each of the daughterboards 22 is connected to the backplane 12 via two connector assemblies 20. However, it will be understood by a person of ordinary skill in the art that each of the daughterboards 22 may be connected to the backplane 12 by one, two or more connector assemblies 20 depending on the specific requirements of the circuit board assembly 10.

Figure 4:
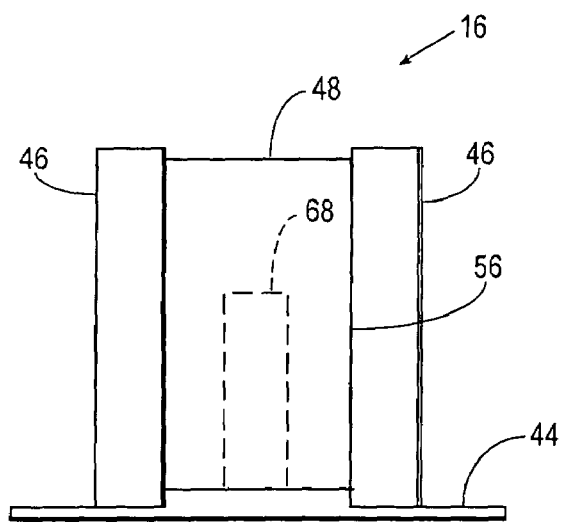
FIG. 4 is a transverse cross-sectional view of the guide insert shown in FIG. 3.

Referring now to FIG. 3, shown therein is a cross-sectional view of a portion of the circuit board assembly 10. The guide insert 16 which extends through the backplane 12 functions to support and guide an optical fiber extension 40 of the fiber optic cable 14 (which may comprise a "pigtail" as known in the art, or any extending portion of the fiber optic cable 14), for optically connecting the daughterboard 22 with the fiber optic cable 14 in the backplane 12. In general, the guide insert 16 has a flange 44, one or more side members 46, at least one guide member 48, and a ferrule connector assembly 50. The flange 44 is connected to the backplane 12 adjacent to the aperture 34 so as to anchor the guide insert 16 to the backplane 12. As depicted in FIG. 3, the backplane 12, in a preferred embodiment, is provided with a recess 52 extending adjacent to the aperture 34. The flange 44 is positioned within the recess 52 thereby securing the guide insert 16 to the backplane 12. The at least one side member 46 is positioned within the aperture 34 so as to extend vertically from the aperture 34. Preferably the side member 46 extends perpendicularly to the flange 44, which extends outwardly and laterally from the at least one guide member 48. Preferably, the guide insert 16 is provided with two side members 46 (see FIG. 4) which are positioned in a parallel orientation and which "sandwich" the at least one guide member 48. The at least one guide member 48 is thus spaced between the guide members 46. The guide member 48 has an arcuate portion 56 which extends a distance generally from near the first side 30 of the backplane 12 to near the second side 32 of the backplane 12. A portion of the optical fiber extension 40 is positioned adjacent to the arcuate portion 56 of the guide member 48 so that the arcuate portion bends the optical fiber extension 40 to a curvature of about 90°. However, the curvature over which the arcuate portion 56 of the guide member 48 bends the optical fiber extension 40 can be varied >90° or <90° so long as the optical fiber extension 40, of the fiber-optic cable 14 is oriented from the second side 32 of the backplane 12 to the first side 30 of the backplane 12 in any manner suitable for the construction of the circuit board assembly 10.

The ferrule connector assembly 50 of the guide insert 16 is positioned adjacent to or extends from a portion of the arcuate portion 56 of the guide member 48. The ferrule connector assembly 50 supports a ferrule 60 which connects to a terminal position of the optical fiber extension 40 in a manner well known to persons of ordinary skill in the art. The ferrule 60 can be any type of fiber optic ferrule, such as an MT-12 ferrule appropriate and suitable for use in accordance with the present invention. Preferably, the guide insert 16 also has an optional vertical support member 68 positioned between side members 46 and adjacent guide member 48 for supporting the ferrule 60.

The guide insert 16 is preferably constructed of an inexpensive material, such as molded thermoplastic material. However, it should be understood that the guide insert 16 can be constructed of any type of material known in the art (e.g., a ceramic) capable of guiding the optical fiber extension 40 and supporting the ferrule 60 connected thereto. In an alternative embodiment, the guide insert 16 is also provided with a second guide member 66 which is similar in construction to the guide member 48. The second guide member 66 is positioned generally opposite and facing, as in mirror image, to the guide member 48 for guiding the optical fiber extension 40 from a direction generally opposite that provided to guide member 48.

The ferrule connector assembly 50, in one embodiment, is constructed from opposing portions of the guide members 48 and 66 in such a configuration that the guide members 48 and 66 grip the ferrule 60 as shown in FIG. 3.

The circuit board assembly 10 may also comprise a communication link 70, such as a fiber optic cable, attached to the daughter board 22 for establishing communication between the optical fiber extension 40 and the daughterboard 22. When the communication link 70 is a fiber optic cable, the communication link 70 is provided with a ferrule 72 connectable to the ferrule 60. The communication link 70 preferably comprises a connector 74 for connecting the communication link 70 to the daughterboard 22. The connector 74 can be an optical, electrical or electro-optical connector depending on the type of communication link 70 (e.g., electrical or optical), as well as the type of circuitry on the daughterboard 22 as understood by persons of ordinary skill in the art.

While the invention is described herein by certain preferred embodiments and examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the examples provided herein which include preferred embodiments serve to illustrate the practice of this invention, it being understood that the particulars shown are by way of example and for purposes of illustrative discussion of preferred embodiments of the present invention only and are presented in the cause of providing what is believed to be the most useful and readily understood description of the components, structures, operational uses, principles, and conceptual aspects of the invention.

Changes may be made in the embodiments of the invention described herein, or in parts or elements of the embodiments described herein, or in the sequence of steps of the methods described herein without departing from the spirit and/or scope of the invention as defined in the following claims.

What is claimed is:

1. A guide insert for connecting an optical fiber extension of a backplane to a daughterboard, comprising:

a first guide member and a second guide member, each first and second guide member having an arcuate portion against which a portion of the optical fiber extension can be positioned for bending the optical fiber extension, wherein the first guide member and the second guide member are positioned opposite each other such that the arcuate portion of the first guide member substantially faces and opposes the arcuate portion of the second guide member;

a ferrule connector assembly for receiving and supporting a ferrule connected to a terminal portion of the optical fiber extension; and a flange portion extending outwardly from a lower portion of the first guide member and a lower portion of the second guide member for securing the guide insert to the backplane;

a first side member adjacent and secured to the first guide member and the second guide member; and a vertical support member positioned between the first guide member and the second guide member and adjacent the first side member for supporting the ferrule connected to the terminal portion of the optical fiber extension.

2. A method of connecting a daughterboard to a backplane having a fiber optic cable, comprising:

provic a backplane having a fiber optic cable and an optical fiber extension extending from a portion of the fiber optic cable;

providing at least one guide insert comprising;

a first guide member and a second guide member, each first and second guide member having an arcuate portion against which a portion of the optical fiber extension can be positioned for bending the optical fiber extension, wherein the first guide member and the second guide member are positioned opposite each other such that the arcuate portion of the first guide member substantially faces and opposes the arcuate portion of the second guide member;

a ferrule connector assembly for receiving and supporting a ferrule connected to a terminal portion of the optical fiber extension; and a flange portion extending outwardly from a lower portion of the first guide member and a lower portion of the second guide member for securing the guide insert to the backplane;

a first side member adjacent and secured to the first guide member and the second guide member; and a vertical support member positioned between the first guide member and the second guide member and adjacent the first side member for supporting the ferrule connected to the terminal portion of the optical fiber extension;

attaching the guide insert to the backplane and inserting a portion of the optical fiber extension within the guide insert such that the portion of the optical fiber extension is bent by the guide member of the guide insert; and attaching a daughterboard to the backplane and establishing a connection between the optical fiber extension and a communication link on the daughterboard.

* * * * *